United States Patent [19]

Steube

[11] Patent Number: 5,058,272
[45] Date of Patent: Oct. 22, 1991

[54] TOOL APPARATUS FOR APPLYING LARGE FORCES

[75] Inventor: Gary J. Steube, Pass Christin, Miss.

[73] Assignee: Mississippi Power Company, Gulfport, Miss.

[21] Appl. No.: 510,887

[22] Filed: Apr. 18, 1990

[51] Int. Cl.$^5$ .................. B26B 17/00; B25F 3/00; B26D 17/00
[52] U.S. Cl. ............................. 30/134; 30/180; 83/701
[58] Field of Search .............. 30/134, 180, 228, 92; 83/701; 72/392; 29/556.1, 252, 283.5

[56] References Cited

U.S. PATENT DOCUMENTS

| | | |
|---|---|---|
| 3,069,943 | 12/1962 | Fischer . |
| 3,255,525 | 6/1966 | Frenzel . |
| 3,706,245 | 12/1972 | Van Schaik . |
| 3,893,237 | 7/1975 | Janhke .................. 30/180 |
| 4,031,619 | 6/1977 | Gregory . |
| 4,261,090 | 4/1981 | De Boer . |
| 4,339,942 | 7/1982 | Svensson . |
| 4,392,263 | 7/1983 | Amoroso ............... 30/134 |
| 4,442,581 | 4/1984 | Molnick . |
| 4,506,445 | 3/1985 | Esten ..................... 30/92 |
| 4,521,963 | 6/1985 | Lind et al. . |
| 4,531,289 | 7/1985 | Brick ..................... 83/701 |
| 4,549,349 | 10/1985 | Harrison ................ 30/134 |
| 4,760,644 | 8/1988 | Yirmiyahu et al. ..... 30/180 |

FOREIGN PATENT DOCUMENTS 1095628 12/1960 Fed. Rep. of Germany ........ 30/180

Primary Examiner—Douglas D. Watts
Assistant Examiner—Heyrana, Sr. Paul M.
Attorney, Agent, or Firm—Neuman, Williams, Anderson & Olson

[57] ABSTRACT

A tool apparatus for applying a large closing force to an object is disclosed. The tool apparatus, capable of improving the efficiency and ease of effort required to crimp nuts onto bolts and to cut materials such as multi-strand cables, bars and the like, comprises first and second jaws, each having first and second portions. Each first portion has a linking end. A mechanism is provided for interconnecting the first and second jaws, and for providing a pivoting point for each of the first and second jaws. A hydraulic cylinder drives a rod linearly along a drive axis from a first position to a second position with a drive force. A scissor mechanism is provided for connecting the rod to the linking end of the first jaw and to the linking end of the second jaw, and for translating and multiplying the drive force to apply an opening force to each of the linking ends, whereby the first portions rotate from their closed position to their open position and the second portions rotate from their open position to their closed position to apply the closing force to the object.

14 Claims, 4 Drawing Sheets

CURVE OF FORCE vs. ANGLE FOR THE FOLLOWING (ILLUSTRATIVE) CONDITIONS:

A = 2.75   B = 7.50   C = 1.00
D = 3.50   M = 1.3125   Q = 1.00
F = 7,853.9 LB. (10,000 psi on 1" CYL.)

TOOL APPARATUS FOR APPLYING LARGE FORCES

FIELD OF INVENTION

This present invention relates to manual, hydraulically operated tools for multiple purposes, and more particularly to a manually-controlled, hydraulically-driven tool which is capable of improving the efficiency and ease of effort required to crimp nuts onto bolts (and the like) and to cut materials such as multi-strand cables, bars and the like).

DESCRIPTION OF THE PRIOR ART

Vandalism of electricity transmission towers is a costly and dangerous problem for utility companies. These towers, which support transmission lines that conduct electricity from generating plants to various locations, are made of metals such as aluminum that are often stolen and melted down for their salvage value. These parts are also often stolen as random acts of violence directed against the towers.

It is very expensive for utility companies to monitor the towers and to replace stolen parts such as support braces and nuts and bolts. Moreover, towers with missing parts pose an electrical and fire hazard to the surrounding area. Towers are built to withstand winds of over 100 MPH, in the event of stormy weather. With nuts and bolts missing, however, they are no longer structurally sound, since support braces may not be adequately connected. Thus, a storm could topple a tower, causing it to collapse, and thereby allowing the transmission lines to contact trees, grass, animals and even people. Fallen lines can shock people and animals and start fires.

Crimping the nuts to the bolts that connect the tower braces reduces the theft and damage to the tower. With the connectors crimped together, removal of parts requires cutting parts away, which is very difficult and time-consuming. Thus, potential vandals are deterred from dismembering towers. However, a great crimping force is necessary to crimp the nut and bolt permanently. As a result, crimping using human-generated force is impractical because the human does not have the required strength. Hydraulically-operated crimpers solve this problem because they produce crimping forces greater than those of which humans are capable.

The hydraulically-operated crimpers of the prior art function well, but all suffer from various drawbacks. For instance, the device disclosed in U.S. Pat. No. 4,521,963 does not generate the extreme force required to crimp the nut onto the bolt permanently. As disclosed in its FIG. 3, a piston displaces a pair of rods of a bracket section in such a manner as directly to cause a pair of cutting jaws to rotate toward one another. Thus, the cutting force is limited to the force developed by the piston. If any great force is to be developed, cylinders that develop a great force must be used. These cylinders tend to be costly and difficult to maintain in operating condition, since the parts tend to wear quickly. Furthermore, the placement of its operating jaws makes it awkward to use in situations where there is not much room to maneuver, especially with bolts that are flush-mounted to the surface of the tower.

Likewise, the device of U.S. Pat. No. 4,442,581 fails to develop the necessary force. In its FIG. 4, a system of appropriate distances designed into an apparatus is disclosed so that a generating force is multiplied at the site of a fixed jaw and a movable jaw by leverage between a movable cantilever arm, a movable jaw receiving member and a movable jaw receiving means. The force developed by the apparatus is in the range of 500 psi, for a 100 psi input. The apparatus also is awkward to use since it is not compact enough to be carried and used by the human operator while working on a tower.

Finally, U.S. Pat. Nos. 3,706,245, 4,031,619 and 4,339,942 disclose crimpers that fail to develop the necessary force. These crimpers also require the human operator to "pump" the device to develop in a reservoir the hydraulic pressure necessary to close the operating jaws. Such pumping becomes fatiguing when repeated throughout the course of the day.

Even if they were capable of developing extreme forces, the inventions of the prior art fail to address the problems caused by such great forces. For instance, the invention must be designed to minimize stresses on any one area. Otherwise, parts will fatigue quickly, thereby severely limiting the operational life of the invention. Similarly, the invention must be designed so that it can be used safely, with minimal vibration or recoil. A recoil could break the invention apart or could knock the operator off-balance, injuring the operator.

SUMMARY OF THE INVENTION

It is thus an object of this invention to provide a new and improved tool apparatus to apply a large closing force to an object.

It is a more particular object of this invention to provide a tool apparatus to crimp nuts onto bolts and/or to cut materials such as multi-strand cables, bars and the like.

It is a further object of this invention to provide a hydraulically-operated tool apparatus that does not fatigue the human operator.

It is also a further object of this invention to provide a tool apparatus that will withstand the forces developed by the apparatus.

It is also a further object of this invention to provide a tool apparatus that is simple to maintain and to use.

It is also a further object of this invention to provide a tool apparatus that is compact and may be used in situations where there is not much room to maneuver.

It is also a further object of this invention to provide a tool apparatus that does not produce a large vibration or recoil when used.

In accordance with these and other objects of this invention, there is disclosed a tool apparatus for applying a large closing force to an object. In an illustrative embodiment, the crimping tool comprises a first and a second jaw, each having first and second portions. Each of the first portions has a linking end and being of a greater length than that of the second portions. A pair of jaw connecting plates provide a pivoting point for the first and second jaws, whereby the first portions rotate from a closed to an open position and the second portions rotate from an open to a closed position. A cylinder is provided with a rod driven linearly along a drive axis from a first position to a second position with a drive force. A scissor linkage connects the linking ends of the first and second jaws and the rod, whereby the drive force is translated and multiplied to apply an opening force to each of the linking ends and the first portions rotate from their closed position to their open position and the second portions rotate from their open position to their closed position to apply the closing force to the object.

In a further aspect of this invention, the scissor linkage comprises a first and a second set of linking members, each set having a first and a second linking member. Each linking member has a first and a second end, whereby the second ends of the first linking members are connected to the first jaw, the second ends of the second linking members are connected to the second jaw and the first ends of the linking members are connected to the rod.

In a still further aspect of this invention, an adjustable post connects the first ends of the linking members to the rod, whereby a maximum angle formed by an intersection of the drive axis and a linking axis formed by the first and second ends of the first set of linking members when the rod is in the second position may be varied.

In a further aspect of this invention, a first and second set of support arms, each having a first and a second support arm, connect the first and second jaws and a rigid frame unit, whereby the first and second jaws and the scissor linkage are prevented from moving along the drive axis and each of the first and second jaws are guided to rotate about its pivot point as the rod is driven from its first to its second position.

In a still further aspect of this invention, the first support arm of the first set of support arms is disposed between the first and second linking members of the first set of linking members, the second linking member of the first set of linking members is disposed between the first and second support arms of the first set of support arms, the first linking member of the second set of linking members is disposed between the first and second support arms of the second set of support arms, and the second support arm of the second set of support arms is disposed between the first and second linking members of the second set of linking members.

In a further aspect of the invention, the cylinder comprises a hydraulic cylinder and is actuated by a hydraulic pump.

DESCRIPTION OF THE DRAWINGS

These and other objects and advantages of the present invention will become apparent by referring to the following detailed description, and accompanying drawings, in which.

DESCRIPTION OF A PREFERRED EMBODIMENT

Figure 1:
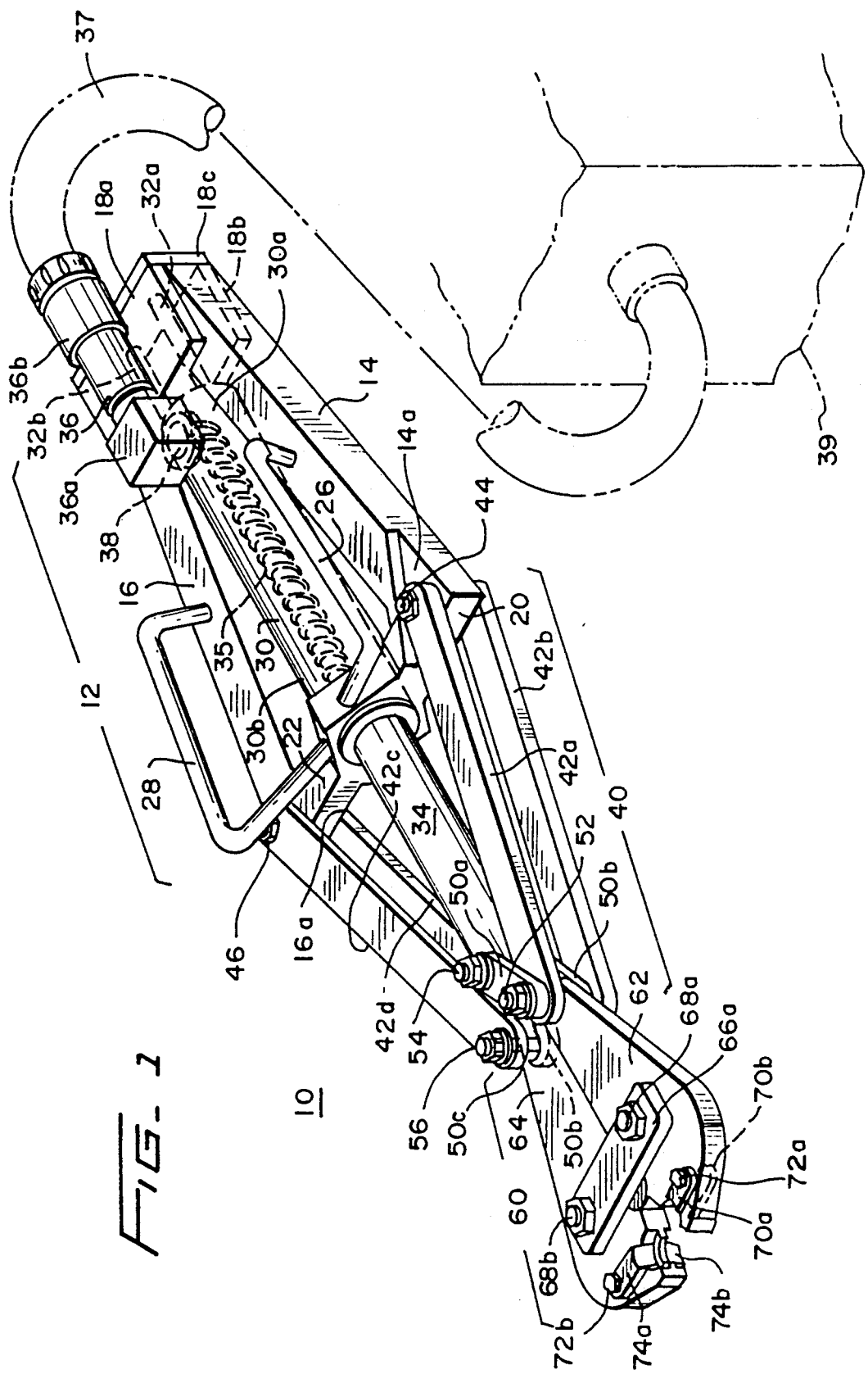
FIG. 1 is a perspective view of a manual, hydraulically operated crimping tool in accordance with the present invention.
Figure 2:
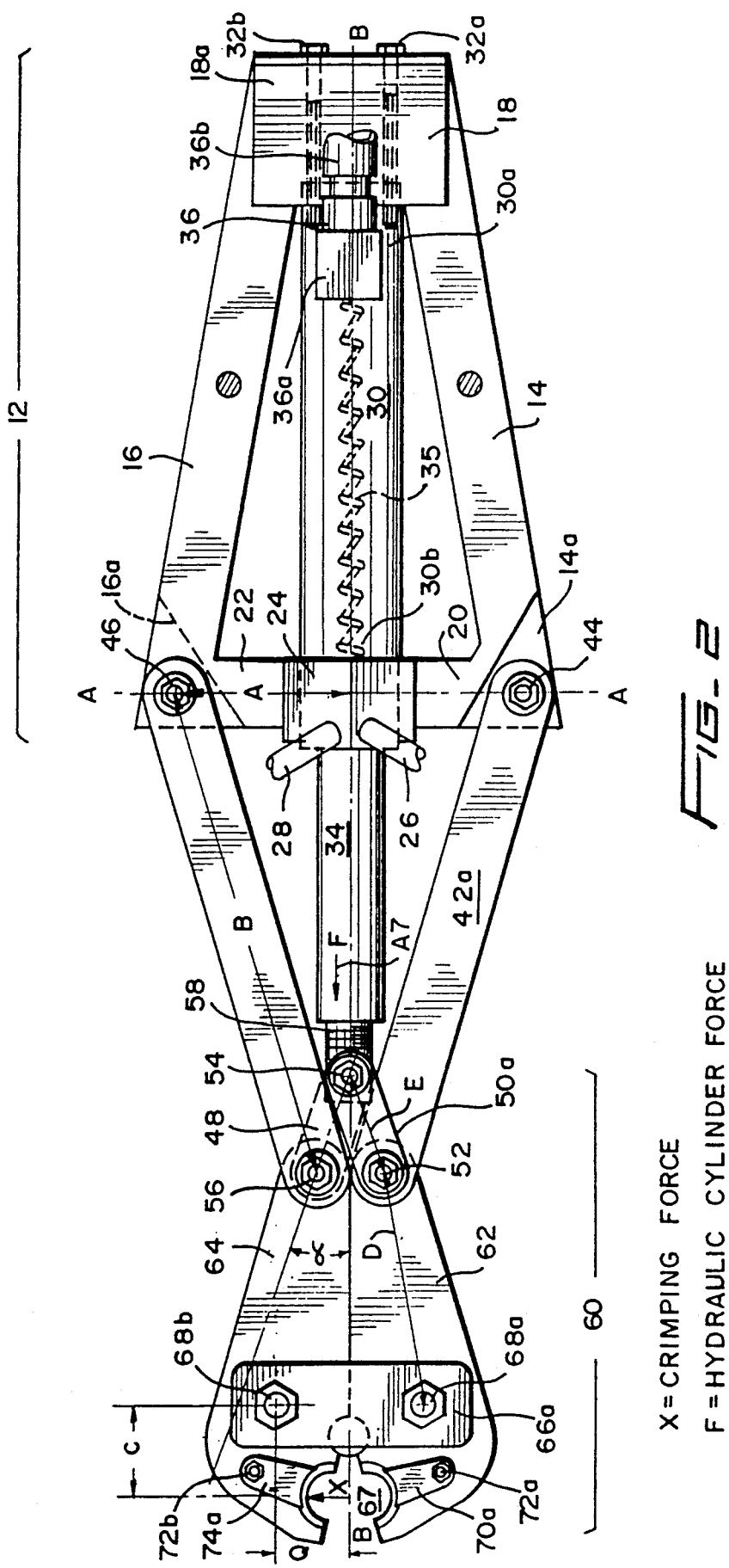
FIG. 2 is a top view of the crimping tool with its jaw assembly open in an at-rest or open position.

Referring now to the drawings, and to FIGS. 1 and 2 in particular, reference numeral 10 denotes an apparatus or tool for crimping bolts. A lower frame unit 12 is comprised of a pair of rigid frame members 14, 16, a base 18 comprised of a pair of base plates 18a, 18b and a base end 18c, a pair of cross supports 20, 22, a hexagon-shaped collar 24, and a pair of handles 26, 28. Base plate 18a is affixed, illustratively by welding, to the top surfaces of the first ends of rigid frame members 14,16, as shown in FIG.1. Similarly, base plate 18b is welded to the bottom surfaces of the first ends of rigid frame members 14,16, as shown in dotted line in FIG.1, so that the first ends of rigid frame members 14,16 converge upon each other, and the base plates 18a and 18b are essentially parallel to each other. Base end 18c is mounted perpendicularly to base plates 18a,18b, and welded in place so that the base plates 18a,18b fit flush against it and the rigid frame members 14,16 abut against it. Thus, the rigid frame members 14,16 essentially form a "V", with the base 18 at the vertex of the V.

Cross supports 20, 22 are welded to opposite sides of the collar 24 and extend in opposite directions therefrom. The end of the cross support 20 remote from the collar 24 is also welded to a second end of the rigid frame member 14 at the diverging portion of the "V" so that a recessed portion 14a, which will be discussed in further detail below, is maintained. Likewise, cross support 22 is also welded to rigid frame member 16 so that a recessed portion 16a is also maintained. One end of each, of a pair of handles 26 and 2 is welded to the rigid frame members 14 and 16, respectively, and the other end to the collar 24.

A hydraulic cylinder 30 with a cylinder base end 30a and a cylinder operative end 30b is attached to the base 18 at the cylinder base end 30a and fitted through the collar 24 at the cylinder operative end 30b so that the cylinder 30 lies between and equidistant from the rigid frame members 14,16, thereby bisecting the angle of intersection of the rigid frame members 14,16. As a result, the line formed by the centers of cross supports 20, 22 (denoted AA in FIG. 2) is perpendicular to the center line of the cylinder 30 (denoted BB in FIG. 2). The cylinder 30 is attached to the base 18 by a pair of screws 32a, 32b, as shown in dotted line in FIGS. 1 and 2, that thread through the base end 18c and into the cylinder base end 30a.

The cylinder 30 is held in place with the collar 24 by friction. A cylinder rod 34 extends from the cylinder operative end 30b. An input opening 38 is disposed in the other end 30a. A disconnect mechanism 36 comprises a pair of female couplers or rotative collars 36a, 36b. The collar 36a is threaded into the input opening 38. The rotative collars 36a, 36b are connected by threading a male coupler (not shown in the FIGS.) into the disconnect mechanism 36. As shown in FIG.1, the disconnect mechanism 36 is connected to an external hydraulic pump 39 by a hose 37 with a male coupler at one end that threads into the female coupler 36b. The cylinder rod 34 is driven from the cylinder 30 when the external hydraulic pump 39 forces hydraulic fluid into the cylinder 30 (via the hose 37, disconnect mechanism 36 and input opening 38) with a force sufficient to overcome the retracting force of a spring 35, as shown in dotted line in FIGS. 1 and 2, connecting the cylinder rod 34 and cylinder end 30a. It has been found that a single action spring return cylinder, illustratively taking the form of the RC55 Single Action Cylinder manufactured by ENERPAC, is suitable for use with the apparatus 10. The ENERPAC single action spring return cylinder extends its cylinder rod when a hydraulic pressure is applied. The spring 35 in the cylinder 30 causes the cylinder rod 34 to retract automatically when the hydraulic pressure is removed. Moreover, it has also been found that rather than directly connecting the cylinder input 38 to a hydraulic pump 39, the ENERPAC 2CR400 and CH604 serve well as the couplers 36a, 36b. They make it possible to connect and disconnect the cylinder input 38 and the hydraulic source with a minimum of time and mess from escaping hydraulic fluid. It should be kept in mind, however, that the use of the mentioned cylinder and couplers is for illustrative purposes only, and should not be construed to limit the scope of the invention.

Figure 4:
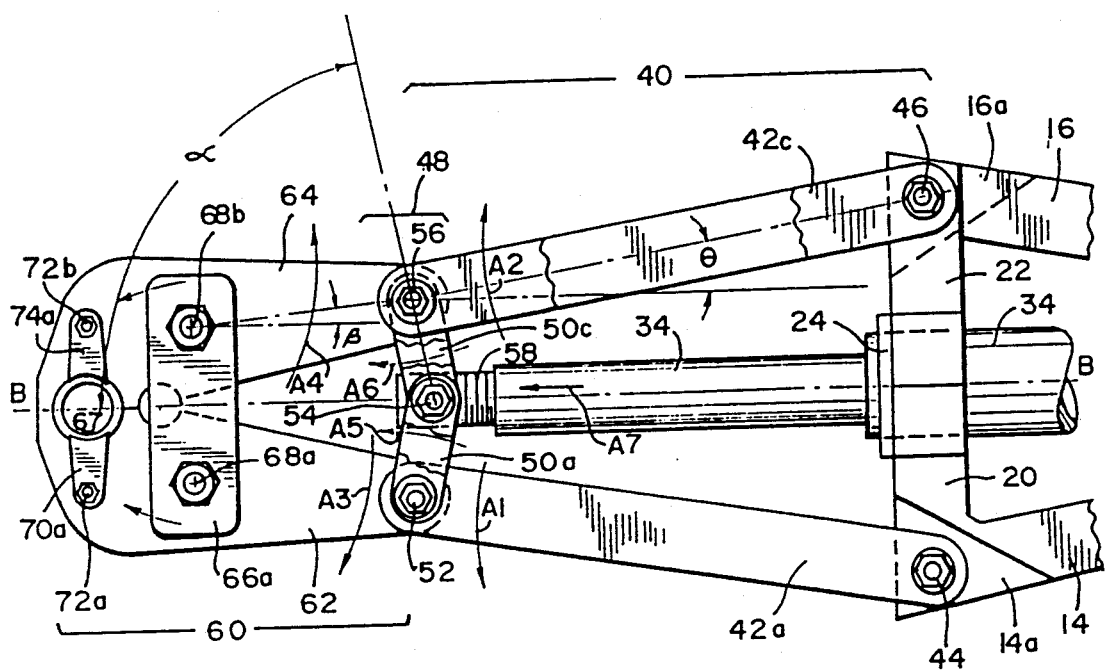
FIG. 4 is a top view of the articulating frame unit, scissor linkage and jaw assembly of the crimping tool depicted in FIG. 1, with the jaw assembly closed in its actuated or closed position.

As best shown in FIGS. 1 and 4, an articulating frame unit 40 has a plurality of support arms 42a, 42b, 42c, and 42d that are attached to the rigid frame members 14, 16 by means of a pair of nut and bolt assemblies 44 and 46. Support arms 42a and 42b sandwich the rigid frame member 14, with support arm 42a disposed in the recessed portion 14a. Support arms 42a and 42b are fastened by the nut and bolt assembly 44 to the frame member 14 to permit rotation of the support arm 42a, 42b as indicated by the arrow A1 to the position shown in FIG. 4 and to rotate back to the position shown in FIG. 1. Support arm 42c, rigid frame member 16 and support arm 42d, which is connected to recessed portion 16a, are similarly connected by nut and bolt assembly 46. Support arms 42c and 42d are free to rotate with respect to frame member 16 as shown by the arrow A2 in FIG. 4.

Figure 3:
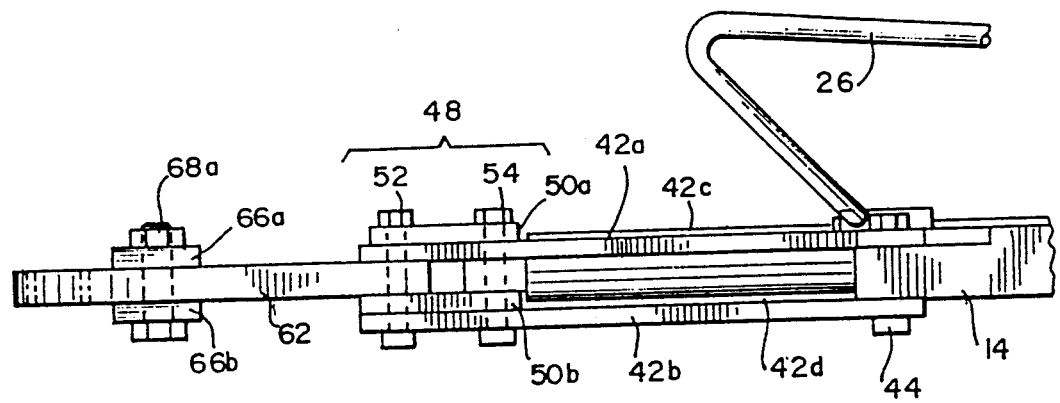
FIG. 3 is side view of the crimping tool depicted in a FIG. 1.

As best shown in FIGS. 1, 3 and 4, the articulating frame unit 40 is also connected to a scissor linkage 48 comprising a plurality of linking members 50a, 50b, 50c, and 50d, a plurality of nut and bolt assemblies 52, 54, and 56, and an adjustable post 58. In turn, the scissor linkage is connected to a jaw assembly 60, which comprises a first operating jaw 62 and a second operating jaw 64. The jaw assembly 60 will be described in greater detail below. As best shown in FIGS. 1 and 3, support arm 42a is sandwiched between linking member 50a and the first jaw 62. The first jaw 62, in turn, is sandwiched between support between the first jaw 62 and support arm 42b. Nut and bolt assembly 52 is inserted through openings in the first ends of the linking members 50a, 50b, the second ends of support arms 42a, 42b, and a first end of the first jaw 62 to allow pivoting of the linking members 50a and 50b with respect to the support arms 42a, 42b and the first jaw 62. Referring to FIG. 3, then, the order of elements from top to bottom is linking member 50a, support arm 42a, first jaw 62, linking member 50b and support arm 42b.

The first ends of the linking members 50c, 50d (50d shown in dotted line in FIG.1), the second ends of the support arms 42c, 42d and the first end of the second jaw 64 are connected in a similar manner by nut and bolt assembly 56, which also allows pivoting. However, the "stacking" of these elements is different. Linking member 50c is sandwiched between support arm 42c and the second jaw 64. The second jaw 64 is sandwiched between linking member 50c and support arm 42d. Finally, support arm 42d is sandwiched by the second jaw 64 and linking member 50d. Thus, the cross-section order of elements from top to bottom is support arm 42c, linking member 50c, second jaw 64, support arm 42d and linking member 50d. The second ends of each of the linking members 50a, 50b, 50c, and 50d are connected by the nut and bolt assembly 54 to the free end of the adjustable post 58.

This "stacking" of elements is necessary to ensure smooth operation of the apparatus 10. Experimental embodiments of the apparatus 10 had linking members 50a, 50c and support arms 42a, 42c co-planar, and linking members 50b, 50d and support arms 42b, 42d also forming another, parallel plane. This arrangement proved unsuitable because the elements tended to bind together after one operation cycle, thereby rendering the apparatus 10 unusable. The recessed portions 14a and 16a permit stacking by offsetting the placement of the support arms 42a and 42d, respectively, from the placement of the support arms 42c and 42b. Since the support arm 42a is offset from the support arm 42c by the recessed portion 14a, the support arm 42a is placed in a different plane parallel to the plane formed by the support arm 42c and linking member 50a. Likewise, since the support arm 42d is offset from the support arm 42b by the recessed portion 16a, the support arm 42d is in a different plane parallel to the plane formed by support arm 42b and linking member 50d. As a result, because these elements are stacked, they do not collide with each other when they pivot, and thus do not bind. Instead, the elements slide smoothly over each other.

Referring now to FIGS. 2 and 4, as previously mentioned, cylinder rod 34 extends from the cylinder operative end 30b. The adjustable post 58 is threaded into an opening in the end 34a of cylinder rod 34. The adjustable post 58 has an opening 58a to permit attachment to linking members 50a, 50b, 50c, and 50d by the nut and bolt assembly 54, which allows the linking members 50a, 50b, 50c, and 50d to pivot about it.

As discussed above, jaw assembly 60 is connected to the scissor linkage 48 and articulating frame unit 40 by nut and bolt assemblies 52 and 56. The first and second jaws 62 and 64 form a jaw opening 67 therebetween and are connected to each other by a pair of jaw connecting plates 66a, 66b, which are held in place by a pair of pins 68a, 68b. As shown in FIGS. 3 and 4, jaw connecting plate 66a is attached to the top of the jaw assembly 60, and jaw connecting plate 66b to the bottom. The first and second jaws 62, 64 pivot about their pins 68a, 68b as illustrated by the arrows A3 and A4 respectively as shown in FIG. 4. Each pin 68 divides its jaw 62 or 64 into a first portion, extending between the pin 68 and that end connected to the linking members 50, and a second portion extending from the pin 68 to the opposite, crimping end. As shown in FIG. 1, a pair of jaw reinforcing plates 70a, 70b (70b shown in dotted lines) is attached to the top and bottom, respectively, of the first jaw 62 by a nut and bolt assembly 72a. Likewise, a pair of jaw reinforcing plates 74a, 74b is attached to the top and bottom, respectively, of the second jaw 64 by a nut and bolt assembly 72b. Jaw reinforcing plates 70a, 70b, 74a, and 74b serve to strengthen first and second jaws 62, 64 at the jaw opening 67. By way of illustration, first and second jaws 62, 64 can be shaped for crimping objects. However, it should be noted that any operation requiring pinching or grasping by two jaws, such as cutting, can also be performed by appropriately shaped jaws. It has been found that a jaw assembly 60 manufactured by a vendor, the BURNDY MD-6 jaw, serves well for crimping bolts on the transmission towers.

FIG. 2 shows the apparatus 10 in its at-rest position, with jaw assembly 60 is in its open position, i.e., the jaw opening 67 open to receive the bolt to be crimped. To actuate the apparatus 10, hydraulic oil is pumped under high pressure by the hydraulic pump 39 through the hose 37 into disconnect mechanism 36. The oil enters the cylinder 30 via cylinder input 38. The pressure of the oil in cylinder 30 forces cylinder rod 34 to extend out of the cylinder 30, moving to the left as illustrated by the arrow A7 shown in FIGS. 2 and 4, thereby actuating the scissor linkage 48 via the adjustable post 58. Since the first ends of the linking members 50b, 50c remote from the adjustable post 58 are connected to the nut and bolt assemblies 52, 56, about which linking members 50a, 50b and 50c, 50d rotate respectively, the scissor linkage 48 is restrained from moving left by the articulating frame unit 40, which prevents the nut and bolt assemblies 52, 56 from moving left. Instead, as the adjustable post 58 pushes against the scissor linkage 48, the linking members 50a, 50b rotate counterclockwise as shown by the arrow A5 of FIG. 4 around the nut and bolt assembly 52, and the linking members 50c, 50d rotate clockwise around the nut and bolt assembly 56 as shown by the arrow A6.

Due to this action, the linking members 50a, 50b separate from the linking members 50c, 50d whereby the first and second jaws 62, 64 are directed to their closed position as illustrated in FIG. 4. The first ends of each of the first and second jaws 62, 64 are rotated respectively clockwise as indicated by the arrow A3 and counterclockwise as indicated by the arrow A4, whereby the first and second jaws 62, 64 attached thereto are rotated, respectively, clockwise as indicated by the arrow A3 and counterclockwise as indicated by the arrow A4 about the pins 68a, 68b, which act as a fulcrum about which the first and second jaws rotate to reach their closed position.

The articulating frame unit 40 serves to hold the scissor linkage 48 and jaw assembly 60 in place, which otherwise would break away from the apparatus 10 because of the large forces involved. The support arms 42a, 42b, 42c and 42d are made of a 0.30% carbon-tool steel to withstand these forces.

After the bolt is crimped, the hydraulic pump 39 is turned off. The spring return action of the spring 35 in cylinder 30 causes the cylinder rod 34 to retract, forcing hydraulic fluid out of the input opening 38, through the hose 37 and back to the hydraulic pump 39. As the cylinder rod 34 retracts, the scissor linkage 48 reverses the above procedure, causing the jaw assembly 60 to open and the apparatus 10 to return to its at-rest state as shown in FIG. 2.

The scissor linkage 48 is a force multiplier mechanism that multiplies the force generated by the hydraulic cylinder 30 and translates the multiplied force to the jaw assembly 60. It can be described as a compound-four-bar system, operating by a "toggle action" similar to that used in rock crushers, where a great crushing force is likewise developed.

Referring to FIGS. 2 and 4, there is shown a static analysis of this "toggle action" to provide an indication of the crimping force developed by the jaws 62, 64 and is in accordance with the following expression:

$$X = \frac{F(M(\sin\alpha) - Q) + \left(\tan\alpha + \tan\left(\sin^{-1}\left(\frac{A - M(\sin\alpha)}{\beta}\right)\right)\right)}{2C}$$

$\alpha$ is an angle alpha formed, as shown in FIG. 4, by the linking members 50a, 50b or 50c, 50d and the axis BB formed by the center of the hydraulic cylinder 30 and cylinder rod 34. $\beta$ is the angle formed, as shown in FIG. 4, between a line passing through the pin 68b and the nut and bolt assembly 56 (or pin 68a and nut and bolt assembly 52) with respect to the line parallel to the BB axis and passing through pin 68b (or 68b). $\theta$ is the angle formed, as shown in FIG. 4, by a line passing through the nut and bolt assemblies 56 and 46 (or nut and bolt assemblies 52 and 44) with respect to a line passing through nut and bolt assembly 56 (or 52) and disposed parallel to the BB axis. "F" is the force developed by the hydraulic cylinder 30. "A" is the distance, as shown in FIG. 2, from the axis BB to the center of nut and bolt assemblies 44 or 46. "B" is the common length of the support arms 42a, 42b, 42c or 42d. "C" is the distance along the BB axis from the center of pins 68a or 68b to the center of jaw opening 67. "D" is the distance along the center of first jaw 62 from nut and bolt assembly 52 to pin 68a, or along the center of second jaw 64 from nut and bolt assembly 56 to pin 68b. "M" is the distance between the centers of the openings disposed in opposite ends of the linking members 50a, 50b, 50c and 50d. "Q" is the distance from pins 68a or 68b to the BB axis.

The derivation of this relationship is set out as follows. The forces developed by the apparatus 10 are illustrated in the symbolic representation of the forces generated by the crimping tool shown in FIG. 5, with the nut and bolt assembly 56' as a free body. Summing all of the vertical forces acting on the nut and bolt assembly 56', one finds three forces: $D_v$, $F_v$ and $B_v$. $D_v$ is the vertical component of the force $D_F$ along the linking members 50c, 50d directed against the nut and bolt assembly 56'. $F_v$ is the vertical component of the force F developed by the hydraulic cylinder 30 and directed against the nut and bolt assembly 56'. $B_v$ is the vertical component of the force along the support arms 42c, 42d directed against the nut and bolt assembly 56'. Since the sum of the forces on a point must equal zero, $D_v$, $F_v$ and $B_v$ sum to zero. Thus, $D_v$ can be expressed in terms of the other forces:

$$D_v = F_v + B_v$$
$$= \frac{F(\tan\alpha)}{2} + \frac{F(\tan\theta)}{2}$$

Then using the trigonometric relationships between sin, cosine and tangent to find the relationships between $\theta, \beta$ and $\alpha$, $\theta$ can be expressed in terms of $\alpha$ as:

$$\sin\theta = \frac{A - M(\sin\alpha)}{\beta},$$

$$\theta = \sin^{-1}\left[\frac{A - M(\sin\alpha)}{\beta}\right]$$

and $\beta$ can be expressed in terms of $\alpha$ as:

$$\sin\beta = \frac{M(\sin\alpha) - Q}{D},$$

-continued $$\beta = \sin^{-1}\left[\frac{M(\sin\alpha) - Q}{D}\right]$$

Substituting the expression for $\theta$ in the equation for $D_y$ above, one can solve for the force $D_F$ of the linking members 50a, 50b, 50c or 50d directed against the nut and bolt assemblies 52 or 56:

$$D_F = D_V \sin\beta$$

$$= D_V\left(\frac{M(\sin\alpha) - Q}{D}\right)$$

Figure 5:
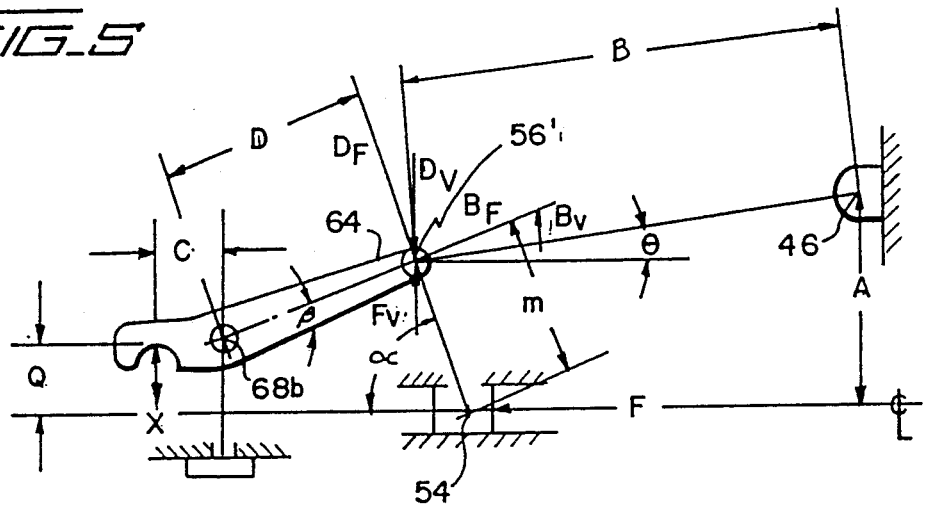
FIG. 5 is a symbolic representation of the forces generated by the crimping tool at various points of the scissor linkage and jaw assembly.

Next, the torques developed about the pin 68b are analyzed. As shown in FIG. 5, two forces develop torque about pin 68b: $D_F$, the sum of the forces directed against the nut and bolt assembly 56', and X, the crimping force. Torque is equal to force times distance. Thus, the torque developed by $D_F$ equals $D_F$ times D, whereas the torque developed by X equals X times C. Since the sum of the torques about a point must also equal zero, the torques developed about pin 68b must equal each other:

$$(X)(C) = (D_F)(D)$$

Dividing both sides by C, the crimping force X may be expressed as:

$$X = \frac{(D_F)(D)}{C}$$

substituting the previously developed equations for $D_F$ and simplifying results in the expression that gives the relationship between the force F developed by the hydraulic cylinder 30 and the crimping force X:

$$X = \left[\frac{F(\tan\alpha)}{2} + \right.$$

$$F\tan\left(\sin^{-1}\left(\frac{A - M(\sin\alpha)}{\beta}\right)\right)\left[\frac{M(\sin\alpha) - Q}{D}\right]\frac{D}{C}$$

$$= F(M(\sin\alpha) - Q)\left(\tan\alpha + \tan\left(\sin^{-1}\frac{A - M(\sin\alpha)}{\beta}\right)\right)$$

Figure 6:
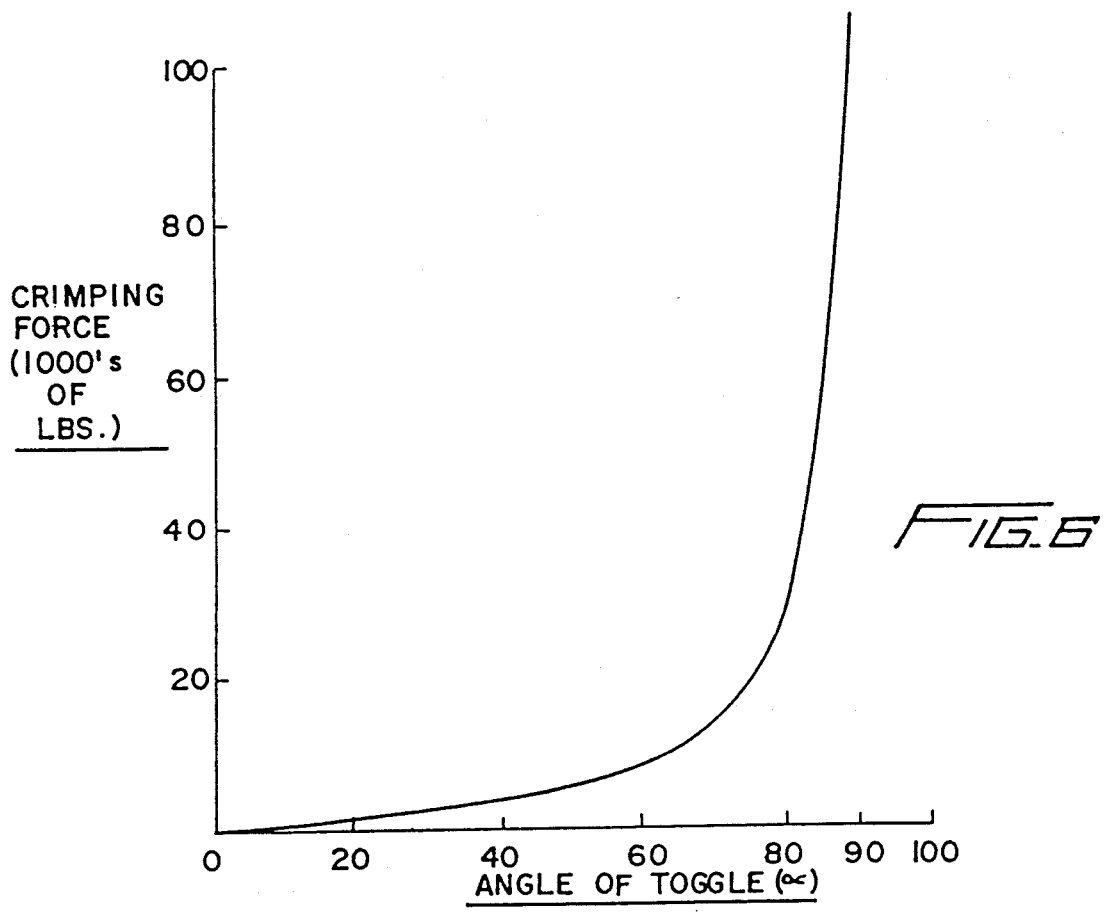
FIG. 6 is plot of crimping forces generated by the crimping tool, given a particular set of dimensions for the crimping tool, with respect to the angle o as indicated in FIG. 5.

As evident in FIG. 6, for an apparatus 10 with the given measurements, the scissor linkage 48 greatly multiplies the force X generated by the hydraulic cylinder 30. In fact, as $\alpha$ approaches 90 degrees (linking members 50a, 50b or 50c, 50d perpendicular to the BB axis), the crimping force X approaches infinity!

In field use, the force F developed by the hydraulic cylinder 30 will be roughly 6,000 pounds. With the adjustable post 58 set so that the angle $\alpha$ approximates 85 degrees, the crimping force X then approximates 46,000 pounds. This force is sufficient to permanently crimp an aluminum nut to a bolt.

Of course, the apparatus 10 will not withstand an infinite force. Thus, the operative elements of the apparatus 10 are made of a Grade 8 "hard" steel to withstand the developed forces. With respect to the static elements of the apparatus 10, i.e., the lower frame unit 12, however, the steel does not need to be as strong. The lower frame unit 12 must withstand only the force F developed by the cylinder 30, which as discussed previously is typically about 6,000 pounds. Consequently, in an alternative embodiment of the lower frame unit 12, the rigid frame members 14, 16, base 18, cross supports 20, 22, collar 24 and handles 26, 28 could be made of a "milder" grade steel or other material that would be strong enough to withstand slightly more than 6,000 pounds, leaving an adequate safety margin, but would not be as heavy as a "hard" steel, resulting in a relatively light-weight and portable apparatus 10.

To ensure that the right and left jaws 62, 64 do not close upon themselves with a self-destructive force, it is necessary to ensure that the linking members 50a, 50b, 50c and 50d do not ever become fully extended, i.e., $\alpha$ does not become 90 degrees. This is done by adjusting the length that the adjustable post 58 extends from the cylinder rod 34. This adjustment is performed by threading the adjustable post 58 into the cylinder rod 34. First, the cylinder rod 34 is fully extended and locked into place by filling the cylinder 30 with hydraulic fluid. The adjustable post 58 is then threaded so that the angle between linking members 50a, 50b and linking members 50c, 50d is slightly less than 180 degrees, that is, so that $\alpha$ is slightly less than 90 degrees. An $\alpha$ between 80 and 85 degrees is preferred because it maximizes the crimping force X, but does not destroy the apparatus 10. If the adjustable post 58 is threaded deeper into the cylinder rod 34, the scissor linkage 48 will not spread as far apart. Conversely, if the adjustable post 58 extends further from the cylinder rod 34, the scissor linkage 48 will extend further apart, thereby increasing $\alpha$. Once the adjustment is completed, the hydraulic fluid is drained from the cylinder 30, thereby allowing the cylinder rod 34 to retract to its at-rest position.

If $\alpha$ is permitted to become 90 degrees, a force destructive to the jaw assembly 60 is developed. Moreover, even if the jaw assembly 60 were not destroyed, the scissor linkage 40 would lock in an "over-center" position, that is, the apparatus 10 would lock in its actuated state. The force of the spring 35 would not be sufficient to reverse the separation of the linking members 50a, 50b and 50c, 50d, and to retract the cylinder rod 34 into the cylinder 30. Consequently, the linking members 50a, 50b would remain separated from the linking members 50c, 50d, whereby the first and second jaws 62, 64 would remain in their closed position as illustrated in FIG. 4. Thus, it is an important feature of the invention that the extension of the adjustable post 58 may be changed to prevent the scissor linkage 40 from locking in an "over-center" position.

It has been found that the jaw assembly 60 warps slightly as the apparatus 10 is repeatedly used, due to the great forces involved. As the jaw assembly 60 warps, the linking members 50a, 50b and 50c, 50d can spread further apart, thereby increasing $\alpha$. Thus, it is necessary occasionally to adjust the adjustable post 58 to ensure that the angle $\alpha$ does not become so great that the right and left jaws 62, 64 close too hard upon themselves. Nevertheless, the jaw assembly 60 must be periodically replaced, as the jaws 62, 64 become worn from repeated use. Replacement is simple, however. Nut and bolt assemblies 52, 54 and 56 need only be removed to replace jaw assembly 60.

It will be apparent to those skilled in the art that the above embodiments may be changed. Therefore, the above embodiments should not be considered as limiting the following claims.

I claim:

1. A tool apparatus for applying a closing force to an object, said tool apparatus comprising:
   a) first and second jaw means;
   b) means for interconnecting said first and second jaw means and for providing a pivoting point for each of said first and second jaw means, each pivoting point dividing its jaw means into first and second portions, whereby said first portions rotate from a closed position to an open position and said second portions rotate from an open to a closed position, each first portion having a length greater than that of said second portion and having a linking end remote from said pivoting point;
   c) drive means for driving a rod linearly along a drive axis from a first position to a second position with a drive force;
   d) scissor means for connecting said drop to said linking end of said first jaw means and to said linking end of said second jaw means, for translating and multiplying said drive force to apply an opening force to each of said linking ends whereby said first portions rotate from their closed position to their open position and said second portions rotate from their open position and said second portions rotate forms their open position to their closed position to apply said closing force to the object, said scissor means comprises a first and second linking means, each o said first and second linking means has a first and a second end, said second end of said first linking means is connected to said linking end of said first jaw means, said second end of said second linking means is connected to said linking end of said second jaw means, and said first ends of said first and second linking means are connected to said rod; and
   e) adjusting means for connecting said first ends of said first and second linking means to said rod, whereby a maximum angle formed by an intersection of said drive axis and a linking axis formed by said first and second ends of said first linking means when said rod is in its second position may be varied.

2. The tool apparatus as claimed in claim 1, further comprising a restraining means of preventing said first and second jaw means and said scissor means from moving along said drive axis and for guiding each of said fist and second jaw means to rotate about its pivot point as said rod is driven from its first to its second position.

3. The tool apparatus as claimed in claim 2 in which said restraining mean comprises support arms means connected to said first and second jaw means and to a frame means.

4. The tool apparatus as claimed in claim 3 in which said support arms means comprises a first and a second arm, each having a first and a second arm end, said first arm ends connected to said frame means, said second arm end of said first arm connected to said first linking means, said second arm end of said second arm connected to said second linking means.

5. The tool apparatus as claimed in claim 3 in which each of said first and second linking mean comprises a first and a second linking member, each linking member having a first and a second end, said second ends of said first and second linking members of said first linking means being connected to said linking end of said first jaw means, said second ends of said first and second linking members of said second linking means being connected to said linking end of said second jaw means, said first ends of said first and second linking members of said first and second linking means being connected to said support arms means.

6. The tool apparatus as claimed in claim 5 in which said support arms means comprises a first and a second set of support arms, each set having a first and a second support arm.

7. The tool apparatus as claimed in claim 6 in which said first support arm of said first set of support arms is disposed between said first and said second linking members of said first linking means, said second linking members of said first linking means is disposed between said first and second support arms of said first set of said support arms, said first linking member of said second linking means is disposed between said first and second support arms of said second set of support arms, and said second support arm of said second set of support arms is disposed between said first and said second linking members of said second linking means.

8. The tool apparatus as claimed in claim 7, wherein said adjusting means connects said first ends of said first and second linking members of said first and said second linking means to said drive means.

9. The tool apparatus as claimed in claim 8 in which said frame means has a first and a second recessed portion, said first support arms of said first and second sets of support arms are offset from each other by said first recessed portion, and said second support arms of said first and second sets of support arms are offset from each other by said second recessed portion, whereby said first support arm of said first set of support arms and said first support arm of said second set of support arms slide freely under and over, respectively, each other, and said second support arm of said first set of support arms and said second support arms of said second set of support arms slide freely under and over, respectively, each other.

10. The tool apparatus as claimed in claim 1 in which said drive means comprises a hydraulic cylinder.

11. The tool apparatus as claimed in claim 10 in which said hydraulic cylinder is actuated by a hydraulic pump.

12. A tool apparatus for applying a closing force to an object, said tool apparatus comprising:
   a) a first and a second jaw;
   b) means for interconnecting said first and second jaws and for providing a pivoting point for each of said first and second jaws to divide each jaw into first and second portions, whereby said first portions rotate from a closed to an open position and said second portions rotate from an open to a closed position, each first portion having a length greater than that of said second portion and having a linking end disposed remotely from said pivoting point;
   c) drive means for driving a rod linearly along a drive axis from a first position to a second position with a drive force;
   d) scissor means for connecting said rod to said linking end of said first jaw and to said linking end of said second jaw, for translating and multiplying said drive force to apply an opening force to each of said linking ends whereby said first portions rotate from their closed position to their open position and said second portions rotate from their open position to their closed position to apply said closing force to the object, said scissor means comprising a first and a second sets of linking members, each set having a first and a second linking member;

d) restraining means for preventing said first and second jaws and said first and second sets of linking members from moving along said drive axis and for guiding each of said first and second jaws to rotate about its pivoting point as said rod is driven from its first to its second position, said restraining means comprising a first and a second set of support arms, each set having a first and a second support arm, and a frame having a first and a second recessed portion, whereby said fist support arm of said first set of support arm and said first support arm of said second set of support arms slide freely under and over, respectively, each other, and said second support arm of said first set of support arms and said second support arm of said second set of support arms slide freely under and over, receptively, each other; and f) adjusting means for connecting said first ends of said first and second linking members of said first and said second sets of linking members to said drive means, whereby a maximum angle formed by an intersection of said drive axis and a linking axis formed by said first and said second ends of said first for second linking members of said first set of linking members when said drive means is in its second position may be varied.

13. Apparatus for crimping a maleable object, said crimping apparatus comprising:
a) first and second jaw means for engaging opposite sides of the maleable object;
b) means for inter connecting said first and second jaw means and for providing a pivoting pint for each of said first and second jaw means dividing its jaw means into first and second portions, whereby said first portions rotate from a closed to an open position and said second portions rotate from an open to a closed position, each first portion being of a length greater than that of said second portion and having a linking end remote from said pivoting point;
c) drive means for driving a rod linearly along a drive axis from a first position to a second position with a relatively small drive force;
d) scissor means for connecting said ford to said linking end of said first jaw mean and to said linking end of said second jaw means, for translating and multiplying said drive force to apply a relatively large force to each of said linking ends whereby said first portions rotate from their closed position to their open position and said second portions rotate from their open position to their closed position to apply said crimping force to the opposite sides of the maleable object, said scissor means having an over center position; and
e) adjusting means for connecting said scissor means to said rod to limit the extent of travel of said rod along said drive axis such that said scissor means is not disposed past said over center position.

14. The crimping apparatus as claimed in claim 12, wherein said scissor means comprises a first and a second linking member, each of said first and second linking members has a first and a second end and a linking axis passing through its first and second ends, said second end of said first linking member is connected to said linking end of said first jaw means, said second end of said second linking member is connected to said linking end of said second jaw means, and said first ends of said first and second linking members are connected to said rod, said over center position occurring as said rod drives said first and second linking members so that their linking axes form a straight line.

* * * * *